June 28, 1927.

A. KATZINGER 1,634,248

REENFORCED BAKING PAN

Filed Oct. 4, 1926

Arthur Katzinger,
Inventor.
R.W.A. Darrah,
Attorney.

Patented June 28, 1927.

1,634,248

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS.

REENFORCED BAKING PAN.

Application filed October 4, 1926. Serial No. 139,480.

This invention relates to pans used for baking bread, cake and similar articles and is employed ordinarily by the wholesale bakeries although obviously the same construction can be used for domestic cooking purposes and for many other purposes, some of which are mentioned herein.

The object of this invention is to provide a strong, durable and simple sanitary baking pan and one which will give greater life and more generally satisfactory results than others now on the market.

This invention aims to provide a maximum of strength and durability with a minimum of expense. Other objects will be apparent from the description and drawings attached hereto.

Figure 1:
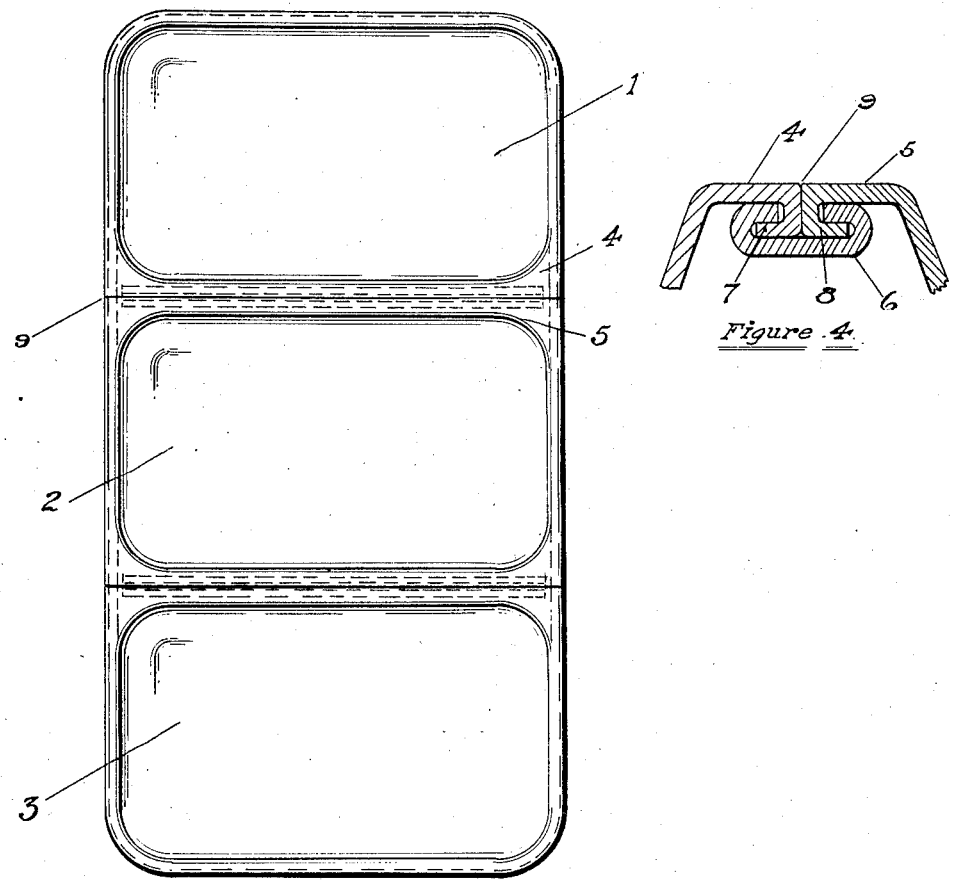
Figure 2:
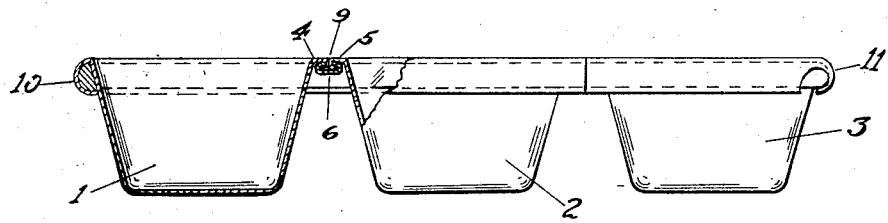
Figure 3:
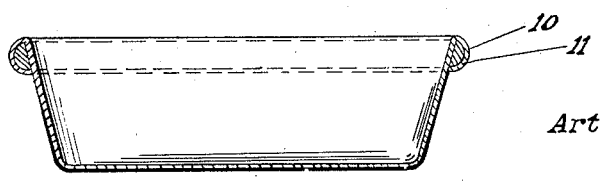

Referring to the drawings, Figure 1 shows a plan view of a series of three pans attached together in a unit in accordance with my invention. Figure 2 shows a side elevation partly in section, while Figure 3 shows an end elevation also in section. Figure 4 shows a detail of the means of attaching the adjacent edges of two adjacent pans and is an enlargement of the corresponding sectional portion of Figure 2.

This invention refers to baking pans which are preferably stamped or drawn in one piece without folds, seams, joints or other crevices or unions. The pans are preferably formed of tin plate although, of course, any desired material may be employed. Referring to the drawings more specifically (1) represents a typical pan which is drawn in a single piece without joints or folds. (2) represents an intermediate pan and (3) represents another end pan similar but opposite to pan (1).

It will be noted that pan (1) is formed with an integral deck or flange (4) which surrounds the pan on all sides. On the adjacent sides between two pans flange (4) is brought into contact with flange (5) of an adjacent pan. A connecting channel strip (6) is placed beneath the adjacent flanges (4) and (5) and interlocked and folded over the respective edges (7) and (8) or flange (4) and (5). By means of this construction only a single joint (9) is left between adjacent pans and otherwise the entire top surface as well as the inside of the pans is smooth and free from cracks, joints, folds or other obstructions.

A wire rod or strap (10) surrounds the entire set of pans and the outer edges of the pans are held in place by the expedient of rolling the flange (11) in contact with member (10), around said member.

In constructing these pans, it is desirable to use a relatively heavy gauge material in some cases as heavy as eighteen or twenty gauge of sheet steel coated with tin plate.

In forming the pans it has been found that it is practical to draw the pans individually to the required depth (that is substantially the depth of a standard loaf of bread). Such a drawing operation does not seem to be feasible unless a certain definite amount of flange is provided around the pans. The amount of flange which can be left is relatively limited depending, of course, upon the nature of the steel, the depth of the drawing, the size, shape and characteristic of the pans and other factors. A good commercial width of flange is approximately that indicated from the relative proportions of the drawing.

It will be evident that the channel strip (6) which holds the two adjacent flanges together should be firmly pressed into the joint formed by the bent flanges (4) and (5) thus giving a firm immovable rigid joint which offers no opportunity for the accumulation of dough, grease or other materials which may later decay.

It will be apparent that plans produced in the manner shown, present an unusually smooth surface from top, bottom and sides and there is a notable absence of any cracks or crevices in which dirt may collect.

It will also be noted that the pans when fastened together in the manner described form an unusually rigid set which will withstand great abuse and have a long life, even under severe conditions.

It will be noted that the intermediate pans of a set have the end flanges rolled over the strap (10) while the side flanges of the intermediate pans are joined together in the manner described.

It will also be apparent that the two end pans of each set have the three outer flanges rolled over the strap (10) while the inner flanges are attached to the adjacent flanges of the intermediate pans.

It will be obvious that the strap (10) may be of square, round, half round or other desired section without departing from the spirit of this invention.

It will also be apparent that any number of pans may be attached together in a set, three pans being selected merely for purposes of illustration.

Many other obvious changes may be made from the arrangement shown and described without departing from the spirit of this invention, some of such changes are the material from which the pans are made, the shape and proportions of the pans, etc.

Having now fully described my invention what I claim as new and wish to secure by Letters Patent in the United States is as follows:

1. A set of baking pans consisting of a multiple number of drawn, seamless units, provided with flanges on all four edges, the flanges on the outer edges of said pans being rolled over a strap which surrounds said set of pans and abuts the ends of each pan, while the flanges on adjacent edges of adjacent pans are butted together, bent downward and partially enveloped by an interlocking member and at their ends rolled over said strap forming a substantially continuous cover for said strap.

2. A multiple of drawn, seamless baking pans, surrounded by a steel strap member which contacts with the ends of each pan, flanges on said pans bent to surround said strap member on all contacting sides, the flanges on the sides forming a continuous cover around the portion of the strap between said pans of said pans adjacent to each other being butted together into a joint and enveloped by a member surrounding the edges of said flanges.

3. A series of drawn baking pans arranged side by side and each having integral flanges on all four sides, a strap member surrounding the series of pans, each of the end members of the series of pans having flanges on three sides drawn over said strap member while the fourth flange of said end members is butted together and held in contact with the adjacent flange of the adjacent pan by an enveloping member said strap member being entirely inclosed by such flanges except at the corner of the set.

4. In a set of baking pans a strap member arranged to unite the pans of the set into a single unit flanges on said pans, said strap butting against the sides of said pans and being entirely inclosed by said pans and flanges except at the corners of the set.

ARTHUR KATZINGER.